United States Patent
Nishimura et al.

(10) Patent No.: US 12,334,581 B2
(45) Date of Patent: Jun. 17, 2025

(54) ELECTRIC VEHICLE

(71) Applicant: KAWASAKI MOTORS, LTD., Akashi (JP)

(72) Inventors: So Nishimura, Akashi (JP); Hiroshi Takeuchi, Akashi (JP); Motoki Kaji, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 26 days.

(21) Appl. No.: 18/501,577

(22) Filed: Nov. 3, 2023

(65) Prior Publication Data
US 2024/0154236 A1    May 9, 2024

(30) Foreign Application Priority Data
Nov. 7, 2022    (JP) ................. 2022-178472

(51) Int. Cl.
*H01M 50/298*    (2021.01)
*B62J 43/16*    (2020.01)
*H01M 50/204*    (2021.01)
*H01M 50/249*    (2021.01)
(Continued)

(52) U.S. Cl.
CPC ............ *H01M 50/298* (2021.01); *B62J 43/16* (2020.02); *H01M 50/204* (2021.01); *H01M 50/249* (2021.01); *H01M 50/271* (2021.01); *H01M 2220/20* (2013.01); *H01R 11/281* (2013.01)

(58) Field of Classification Search
CPC ............. H01M 50/298; H01M 50/204; H01M 50/249; H01M 50/271; H01M 2220/20; B62J 43/16; B62J 43/23; B62J 43/28; B62J 11/19; H01R 11/281; B62K 11/04; B62K 2204/00; B60L 50/64; B60L 50/66; B60L 2200/12; B62M 7/02; B60R 16/04; B60R 16/033
See application file for complete search history.

(56) References Cited

U.S. PATENT DOCUMENTS

| | | | | |
|---|---|---|---|---|
| 4,769,295 | A * | 9/1988 | Kudo | H01M 50/55 429/7 |
| 7,400,111 | B2 * | 7/2008 | Kishibata | H01M 50/278 320/104 |

(Continued)

FOREIGN PATENT DOCUMENTS

WO    2015068753 A1    5/2015

*Primary Examiner* — Jared Fureman
*Assistant Examiner* — Michael J Warmflash
(74) *Attorney, Agent, or Firm* — Alleman Hall & Tuttle LLP

(57) ABSTRACT

An electric vehicle includes: an electric motor that generates rotational power by which a driving wheel is driven; a battery case defining a battery accommodating space accommodating at least one battery; connectors that are located in the battery case, accommodated in the battery accommodating space, and electrically connected to respective terminals of the battery; and electric power lines through which electric power of the battery is supplied to the electric motor. The electric power lines include a connection circuit that includes a connection portion where the electric power lines extending from the connectors are connected to each other, the connection portion being located in an adjacent region located adjacent to the connectors.

15 Claims, 6 Drawing Sheets

(51) Int. Cl.
*H01M 50/271* (2021.01)
*H01R 11/28* (2006.01)

(56) References Cited

U.S. PATENT DOCUMENTS

| | | | |
|---|---|---|---|
| 2006/0279086 A1* | 12/2006 | Kishibata | H01M 50/249 |
| | | | 290/31 |
| 2014/0015421 A1* | 1/2014 | Mituyasu | H05B 45/10 |
| | | | 315/161 |
| 2016/0280306 A1 | 9/2016 | Miyashiro et al. | |
| 2016/0318580 A1* | 11/2016 | Miyashiro | B62K 11/00 |
| 2016/0359345 A1* | 12/2016 | Uesugi | H02J 7/00047 |
| 2017/0113634 A1* | 4/2017 | Tanaka | B62M 23/02 |
| 2020/0212414 A1* | 7/2020 | Takeuchi | H02J 7/0045 |
| 2020/0385079 A1* | 12/2020 | Ueno | B62M 7/02 |

* cited by examiner

ELECTRIC VEHICLE

CROSS-REFERENCE TO RELATED APPLICATIONS

This application claims priority to and the benefit of Japanese Patent Application No. 2022-178472 filed on Nov. 7, 2022, the entire disclosure of which is incorporated herein by reference.

BACKGROUND OF THE INVENTION

Field of the Invention

The present disclosure relates to an electric vehicle including a battery case accommodating a battery.

Description of the Related Art

International Publication No. 2015/068753 discloses an electric vehicle including a driving wheel driven by a motor. In the vehicle disclosed in International Publication No. 2015/068753, a battery case can accommodate two batteries. The battery case includes connectors connected to the batteries. Electric power from the batteries is supplied through the connectors to a motor control unit.

International Publication No. 2015/068753 discloses that the connectors and the motor control unit are connected to each other through electric wires. In the electric vehicle disclosed in International Publication No. 2015/068753, the electric wires through which the electric power is supplied to the motor control unit are located for the respective connectors. Therefore, a region occupied by the electric wires increases in size as a distance between the battery case and the motor increases.

SUMMARY OF THE INVENTION

An object of the present disclosure is to provide an electric vehicle that can reduce the size of a region occupied by electric wires in a battery case.

An electric vehicle of the present disclosure includes: an electric motor that generates rotational power by which a driving wheel is driven; a battery case defining a battery accommodating space accommodating at least one battery; connectors that are located in the battery case, accommodated in the battery accommodating space, and electrically connected to respective terminals of the battery; and electric power lines through which electric power of the battery is supplied to the electric motor. The electric power lines include a connection circuit that includes a connection portion where the electric power lines extending from the connectors are connected to each other, the connection portion being located in an adjacent region located adjacent to the connectors.

According to the present disclosure, the battery case includes the connection portion where the electric power lines extending from the connectors are connected to each other. Therefore, the volume of the electric power lines can be made smaller than when the electric power is supplied to the electric motor without connecting the electric power lines to each other. Moreover, the connection portion is located in the adjacent region located adjacent to the connectors. Therefore, the volume of the electric wires constituting the connection portion can be made smaller than when the connection portion is located far from the battery case.

The above object, other objects, features, and advantages of the present disclosure will be made clear by the following detailed explanation of preferred embodiments with reference to the attached drawings.

DETAILED DESCRIPTION

Hereinafter, a straddled vehicle according to an embodiment will be described with reference to the attached drawings. In the present specification, a front-rear direction, a left-right direction (lateral direction), and an upper-lower direction are directions when viewed from a rider who is seated on the straddled vehicle.

Figure 1:
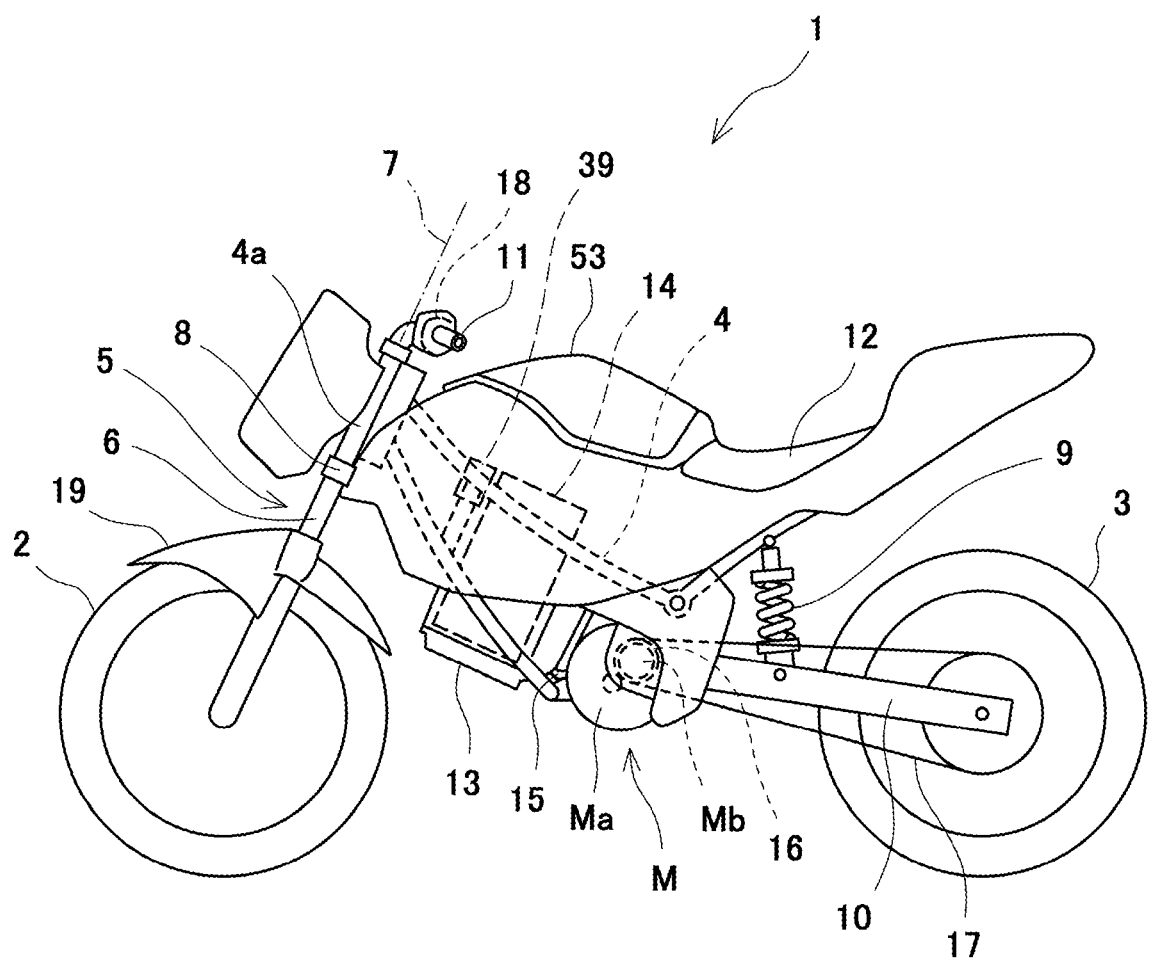
FIG. 1 is a side view showing an electric vehicle according to an embodiment of the present disclosure.

FIG. 1 is a side view of an electric vehicle 1 (vehicle) according to the embodiment. As shown in FIG. 1, in the present embodiment, the electric vehicle 1 is a straddled vehicle and is a motorcycle.

The electric vehicle 1 includes a front wheel 2, a rear wheel 3, and a vehicle body frame 4. The vehicle body frame 4 is supported by the front wheel 2 and the rear wheel 3. The electric vehicle 1 includes a front fork 5 that connects the front wheel 2 and the vehicle body frame 4 and is located between the front wheel 2 and the vehicle body frame 4. The front fork 5 is coupled to a bracket 8 which is located under a steering shaft 7 so as to be spaced apart from the steering shaft 7 in the upper-lower direction. The front fork 5 extends in an upper, rear, and diagonal direction. The front fork 5 includes a front suspension 6. The front fork 5 can expand and contract in its longitudinal direction when a spring in the front suspension 6 elastically deforms. The front fork 5 expands and contracts in the longitudinal direction to ease shock transmitted to the vehicle body frame 4. The steering shaft 7 connected to the bracket 8 is supported by a head pipe 4a, which is part of the vehicle body frame 4, so as to be angularly displaceable. Moreover, the electric vehicle 1 includes a rear suspension 9 that connects the rear wheel 3 to a rear portion of the vehicle body frame 4. Furthermore, a swing arm 10 supporting the rear wheel 3 and extending in the front-rear direction is supported by the vehicle body frame 4 so as to be angularly displaceable.

A handlebar 11 held by the rider with his/her hands is located at the steering shaft 7. An outer lid 53 covering a battery insertion opening is located behind the handlebar 11. A seat 12 on which the rider is seated is located behind the outer lid 53. The electric vehicle 1 includes an electric motor M as a driving source that generates force to be transmitted to the wheel. The electric motor M is mounted on the vehicle body frame 4 so as to be located between the front wheel 2 and the rear wheel 3. In the present embodiment, the electric motor M serves as a prime mover that generates rotational driving force to be transmitted to the rear wheel 3.

The electric vehicle 1 includes a battery 14 and a battery case 13 accommodating the battery 14 therein. The battery 14 stores electric power to be supplied to electrical components. Moreover, in the present embodiment, the battery 14 supplies the electric power to the electric motor M. Thus, the electric motor M is driven, and the electric vehicle 1 travels. The battery 14 is connected to the electric motor M through an electric wire. The battery case 13 is attached to the vehicle body frame 4.

The electric motor M includes a motor case Ma and a motor drive shaft Mb projecting from the motor case Ma. A sprocket 16 is located at the motor drive shaft Mb so as to rotate together with the motor drive shaft Mb. Instead of the sprocket 16, a gear or a pulley may be used as a rotary member. Then, a chain 17 is connected to the sprocket 16 located at the motor drive shaft Mb. Thus, the driving force output by the motor drive shaft Mb is transmitted to the rear wheel 3 through the chain 17. A member through which the driving force output by the motor drive shaft Mb is transmitted to the rear wheel 3 is not limited to the chain and may be another power transmitting member, such as a belt.

In the present embodiment, an ECU (electronic control unit) 39 is located in front of the battery case 13. The ECU 39 controls the driving of the electric motor M by adjusting the electric power to be supplied from the battery 14 through a BMU (battery management unit) and an inverter to the electric motor M. Throttle equipment 18 is operated by the rider and controls the driving of the electric motor M in accordance with the operation of the rider.

When the rider drives the electric vehicle 1, and shock acts on the vehicle body by, for example, unevenness of a traveling path while traveling, the front fork 5 expands and contracts in the longitudinal direction. Since the front suspension 6 expands and contracts to ease the shock to be transmitted to the vehicle body frame 4, the shock transmitted to the rider can be reduced. Thus, the ride quality for the rider can be improved.

Moreover, the electric vehicle 1 includes a front fender 19 that is connected to the front fork 5 and moves up and down together with the front fork 5 in accordance with the expansion and contraction of the front fork 5. In the present embodiment, the front fender 19 is attached to the front fork 5 so as to project from the front fork 5 in the front-rear direction and cover an upper side of the front wheel 2.

Figure 2:
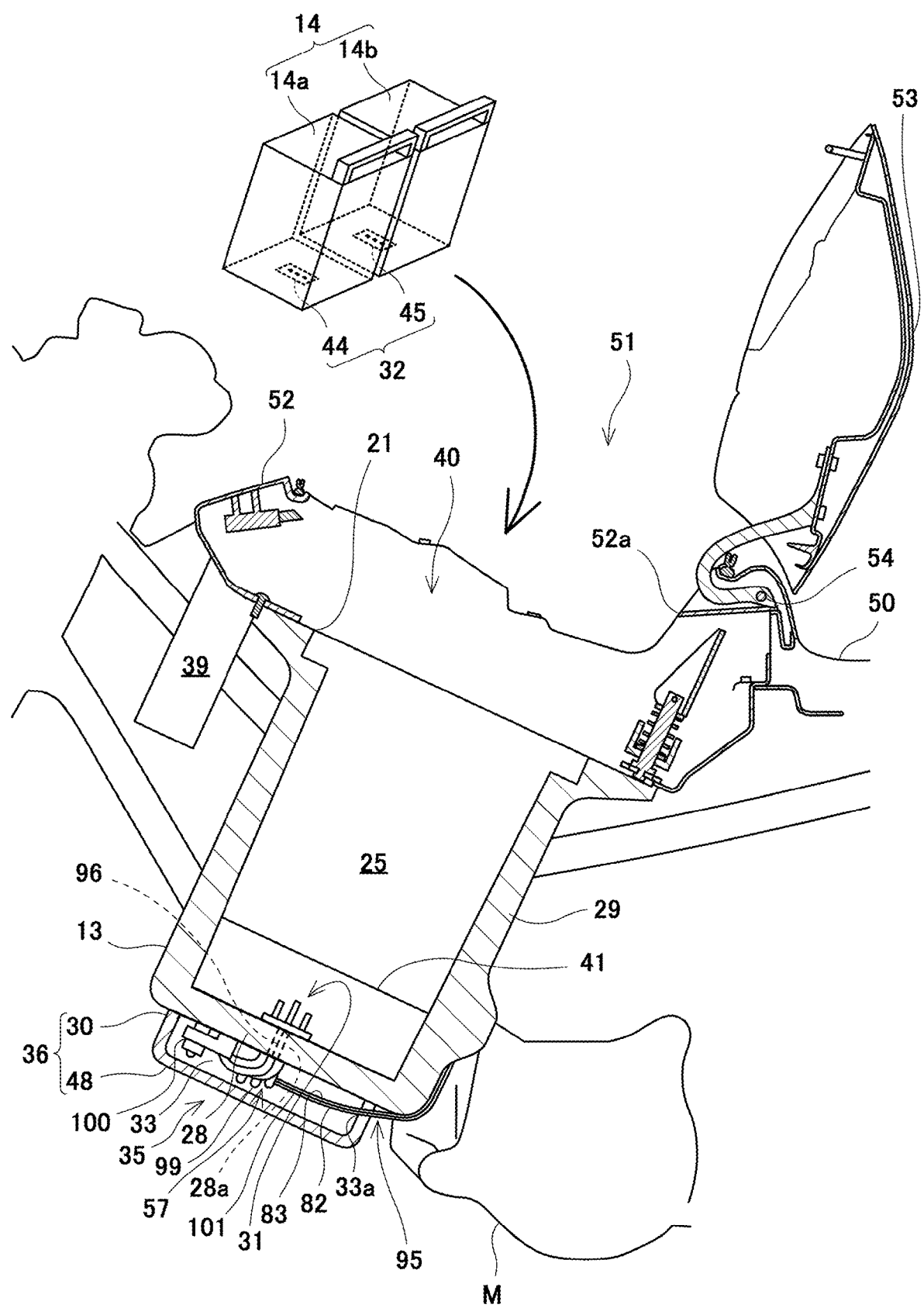
FIG. 2 is a sectional view taken along a plane extending in a front-rear direction and showing a battery case of the electric vehicle of FIG. 1 and its vicinity when an outer lid is opened, and an inner lid is detached.

Next, the configuration of the battery case 13 will be described. FIG. 2 is a sectional view taken along a plane extending in the front-rear direction and showing the battery case 13 and its vicinity when the outer lid 53 covering an insertion opening 40 of the electric vehicle 1 is opened, and an inner lid that is located at an inner side of the outer lid 53 and covers an upper side of the battery 14 is detached.

As shown in FIG. 2, the battery case 13 is a case that can accommodate the battery 14. The battery case 13 includes an accommodating space 25 that accommodates the battery 14. In the present embodiment, the battery case 13 includes the accommodating space 25 that corresponds to two batteries 14a and 14b so as to accommodate the two batteries 14a and 14b. Moreover, the battery case 13 includes: an inner bottom wall 28 that is inclined downward as it extends rearward; and a side wall 29 that extends upward from the inner bottom wall 28 and surrounds a lateral side of the accommodating space 25. Furthermore, the battery case 13 includes an opening 21 that opens the accommodating space 25 of the battery 14 to an upper side such that the battery 14 is put in or taken out from the accommodating space 25. When the battery case 13 is attached to the electric vehicle 1, the battery case 13 is inclined relative to a vertical direction such that the opening 21 is directed in an upper, rear, and diagonal direction. To be specific, the battery case 13 is attached to the electric vehicle 1 so as to be inclined rearward as it extends upward from its lower end.

Moreover, as shown in FIG. 2, a lid body 36 is attached to the battery case 13. The lid body 36 defines an adjacent region 33. The adjacent region 33 is formed between the lid body 36 and the inner bottom wall 28 by attaching the lid body 36 to an outer surface of the inner bottom wall 28 of the battery case 13. To be specific, the lid body 36 covers the adjacent region 33 from below. The lid body 36 includes: an outer bottom wall 48 covering the adjacent region 33 from below; and a peripheral wall 30 connecting the outer bottom wall 48 to the inner bottom wall 28. Since the battery case 13 is attached to the electric vehicle 1 so as to be inclined, the outer bottom wall 48 attached to the electric vehicle 1 is inclined downward as it extends rearward. Similarly, the inner bottom wall 28 attached to the electric vehicle 1 is inclined downward as it extends rearward. In the present embodiment, the inner bottom wall 28 and side wall 29 of the battery case 13 are large in thickness in order to support the battery 14. Moreover, the lid body 36 does not have to support the battery 14, and a main object of the lid body 36 is protection from dust and rain water. Therefore, the lid body 36 is smaller in thickness than the battery case 13. Connectors 31 projecting toward an inside of the accommodating space 25 are located on the inner bottom wall 28 of the battery case 13. In the present embodiment, two connectors 31 are located so as to correspond to a first battery 14a and a second battery 14b which are mounted on the battery case 13. Moreover, the inner bottom wall 28 includes connector attaching holes 28a to which the connectors 31 are attached. Two connector attaching holes 28a are lined up in a width direction so as to correspond to the two connectors 31.

Electric power lines connected to the connectors 31 are located in the adjacent region 33. In the present embodiment, the adjacent region 33 is located outside the accommodating space 25 and is adjacent to the accommodating space 25 across the inner bottom wall 28. Moreover, the adjacent region 33 is located adjacent to the connectors 31 across the inner bottom wall 28. The electric power lines are wires through which the electric power from the battery 14 is supplied to electric components, such as the electric motor M and a DC/DC converter. For example, each electric power line may be a copper wire covered with resin, such as vinyl, or part of the electric power line may be a plate-shaped bus bar. The electric power line may be anything as long as it includes a conductor and can supply the electric power from the battery 14 to the electric motor M.

Electric power lines 95 connected to the connectors 31 in the adjacent region 33 extend in the adjacent region 33 through a connection circuit 57 at which the electric power lines 95 are connected to each other once. Then, the electric power lines 95 extend through a rear portion of the adjacent region 33 to the outside and extend rearward. The electric power lines 95 extend from the connectors 31, penetrate the inside of the inner bottom wall 28 of the battery case 13, extend toward the adjacent region 33, extend rearward in the adjacent region 33, project to the outside of the adjacent region 33, and extend toward the electric motor M. In the present embodiment, the outer bottom wall 48 and the peripheral wall 30 are formed separately from the inner bottom wall 28. Moreover, the outer bottom wall 48 and the peripheral wall 30 are included in the lid body 36 as one piece. In the present embodiment, the inner bottom wall 28 and the lid body 36 define the adjacent region 33 between the inner bottom wall 28 and the lid body 36.

Figure 3:
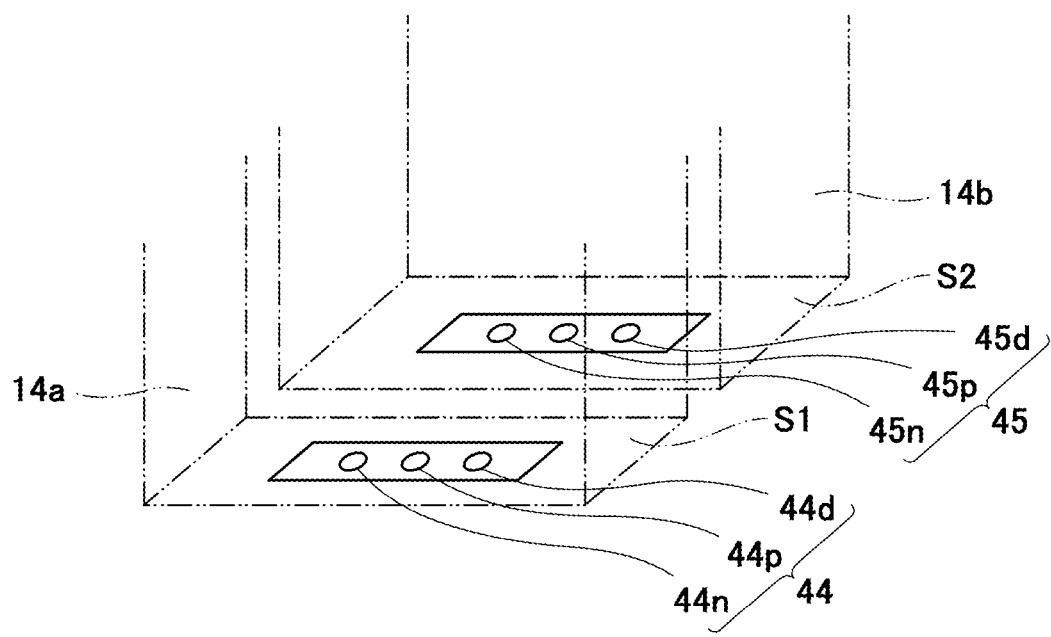
FIG. 3 is a perspective view showing terminals of batteries and connectors of the battery case in the electric vehicle of FIG. 1.
Figure 3:
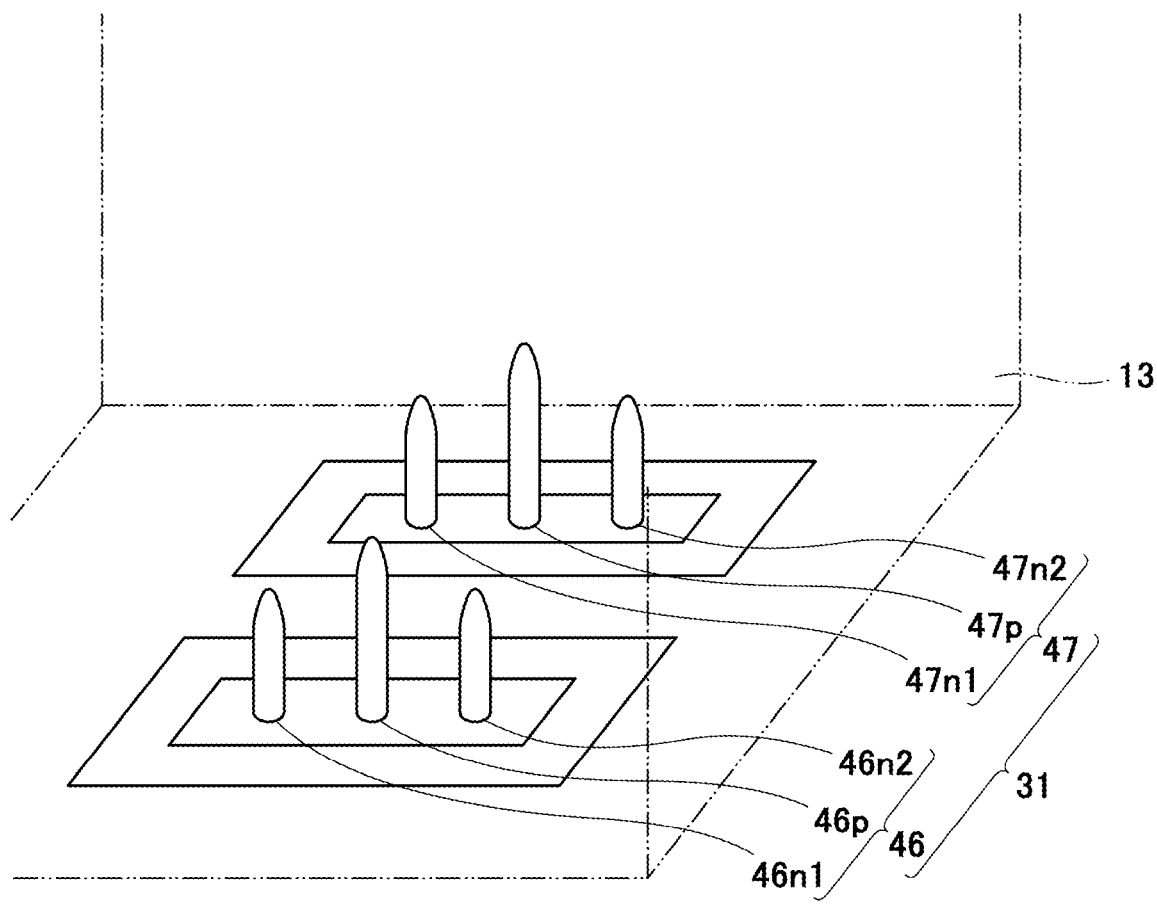

The battery 14 includes a terminal 32 connected to the connectors 31 when the battery 14 is accommodated in the accommodating space 25 of the battery case 13. FIG. 3 is a perspective view showing the terminal 32 of the battery 14 and the connectors 31 of the battery case 13. In the present embodiment, the terminal 32 is located on a bottom surface of the battery 14. Moreover, in the present embodiment, the terminal 32 includes outlets located at the battery 14. In the present embodiment, the outlets include holes. Moreover, each connector 31 includes three cylindrical pins including round tips. Contacts are located in the outlets of the battery 14. When the connectors 31 as the pins are inserted into the terminal 32 as the outlets, the connectors 31 contact the contacts of the battery 14, and thus, the connectors 31 and the terminal 32 are electrically connected to each other. In the present embodiment, the terminal of the first battery 14a is a first terminal 44, and the terminal of the second battery 14b is a second terminal 45. These terminals are collectively called the terminal 32. The connectors 31 and the terminal 32 of the battery 14 are connected to each other, and the electric power from the battery 14 can be supplied through the electric power lines to the electrical components and the like.

The electric vehicle 1 includes an outer lid member 51 located in front of the seat 12 and above the inner lid. The outer lid member 51 is located above the inner lid and is part of an outer surface of the electric vehicle 1. In addition, the outer lid member 51 is located above the battery case 13 and can open and close the outer lid 53. When the battery 14 is accommodated in the battery case 13 mounted on the electric vehicle 1, the battery 14 is protected by the battery case 13, the inner lid, and the outer lid member 51.

The outer lid member 51 includes: a base 52 including an opening 52a; the outer lid 53 that can open and close the opening 52a of the base 52; and a hinge portion 54 by which the outer lid 53 is turnably connected to the base 52. The outer lid 53 turns about the hinge portion 54 to open and close relative to the base 52. The hinge portion 54 is located at a rear portion of the base 52 such that the outer lid 53 opens toward a rear side.

As a space through which the battery 14 passes when putting the battery 14 in the battery case 13 or taking out the battery 14 from the battery case 13, the insertion opening 40 is located inside the base 52. The insertion opening 40 is located above the battery case 13 in a battery insertion direction. When the outer lid 53 is opened, the inside of the accommodating space 25 of the battery case 13 is accessible through the insertion opening 40, and the battery 14 can be accommodated in the accommodating space 25.

As shown in FIG. 2, in the present embodiment, the battery case 13 is attached to the electric vehicle 1 so as to be adjacently located in front of the electric motor M. The battery case 13 is located between the front fork 5 and the electric motor M in the front-rear direction of the electric vehicle 1. In the present embodiment, as described below, the battery case 13 is located so as to be inclined.

In the present embodiment, as described above, the battery case 13 is attached to the vehicle body frame 4 so as to be inclined rearward as it extends upward from its lower end. Therefore, there is a space which is located in front of the battery case 13 and at which things can be put. In the present embodiment, the ECU 39 is located at this space located in front of the battery case 13.

When accommodating the battery 14 in the battery case 13, the outer lid 53 covering the insertion opening 40 is opened. When the outer lid 53 is opened, the inside of the accommodating space 25 of the battery case 13 is accessible from the outside. The battery 14 passes through the insertion opening 40 of the base 52 and the opening 21 of the battery case 13 and is accommodated in the accommodating space 25 of the battery case 13. Then, the insertion opening 40 is closed by the outer lid 53. Thus, accommodating the battery 14 in the battery case 13 is completed.

In the present embodiment, the battery 14 includes the first battery 14a and the second battery 14b. The first battery 14a includes the first terminal 44. To be specific, in the terminal 32, the first terminal 44 is the terminal included in the first battery 14a. In the present embodiment, the first battery 14a includes one positive output terminal 44p, one negative output terminal 44n, and one dummy terminal 44d. Moreover, the second battery 14b includes the same structure as the first battery 14a.

In the first terminal 44 of the first battery 14a, the negative output terminal 44n and the dummy terminal 44d are located so as to sandwich the positive output terminal 44p and have 180-degree rotational symmetry about the positive output terminal 44p. In the present embodiment, when the first terminal 44 of the first battery 14a is connected to the connector of the battery case, the electric power is supplied from the battery 14 through the negative output terminal 44n to the electric motor M, but the electric power is not supplied from the battery 14 through the dummy terminal 44d to the electric motor M.

To be specific, in the first battery 14a, since one output terminal (negative output terminal 44n) and the the dummy terminal 45d sandwich the other output terminal (positive output terminal 44p) and have 180-degree rotational symmetry, i.e., the first terminal 44 has rotational symmetry as a whole, the first terminal 44 of the first battery 14a, the connector 31 of the battery case 13, and the electric power lines are configured such that even when a direction in which the first battery 14a is inserted into the battery case 13 is changed, the electric power from the first battery 14a can be supplied to the electric motor M through the positive output terminal 44p and the negative output terminal 44n. Similarly, in the second battery 14b, one output terminal (negative output terminal 45n) and a dummy terminal 45d sandwich the other output terminal (positive output terminal 45p) and have 180-degree rotational symmetry about the positive output terminal 45p. Since the negative output terminal 45n and the dummy terminal 45d have 180-degree rotational symmetry about the positive output terminal 45p, and the second terminal 45 has rotational symmetry as a whole, the second terminal 45 of the second battery 14b, the connector 31, and the electric power lines are configured such that even when a direction in which the second battery 14b is inserted into the battery case 13 is changed, the electric power from the second terminal 45 of the second battery 14b can be supplied to the electric motor M through the positive output terminal 45p and the negative output terminal 45n.

A connector 46 is located inside the battery case 13 so as to correspond to the first terminal 44 of the first battery 14a, and a connector 47 is located inside the battery case 13 so as to correspond to the second terminal 45 of the second battery 14b. To be specific, the connectors 31 include the connector 46 corresponding to the first terminal 44 of the first battery 14a and the connector 47 corresponding to the second terminal 45 of the second battery 14b. In the connector 46 corresponding to the first terminal 44 of the first battery 14a, a connector 46p (positive connector) connected to the positive output terminal 44p is located at the middle in the front-rear direction, and a connector 46n1 (negative connector) connected to the negative output terminal 44n and a connector 46n2 connected to the dummy terminal 44d sandwich the connector 46p connected to the positive output terminal 44p and have 180-degree rotational symmetry. Similarly, in the connector 47 corresponding to the second battery 14b, a connector 47p (positive connector) connected to the positive output terminal 45p is located at the middle in the front-rear direction, and a connector 47n1 (negative connector) connected to the negative output terminal 45n and a connector 47n2 connected to the dummy terminal 45d sandwich the connector 4'7p connected to the positive output terminal 45p and have 180-degree rotational symmetry.

When the first battery 14a is at a reversed position, the connector 46n2 connected to the dummy terminal 44d when the first battery 14a is at a normal position is connected to the negative output terminal 44n and serves as a negative connector. When the second battery 14b is at a reversed position, the connector 47n2 connected to the dummy terminal 45d when the second battery 14b is at a normal position is connected to the negative output terminal 45n and serves as a negative connector. Therefore, even when the direction of the first battery 14a or the direction of the second battery 14b is changed, the positive output terminal and the negative output terminal are connected to the positive connector and negative connector of the battery case 13, and the electric power of the battery 14 can be supplied to the electric motor M. Therefore, a user can accommodate the battery 14 in the accommodating space 25 of the battery case 13 without paying attention to the direction of the battery 14. Thus, the battery 14 and the battery case 13 which are high in usability for the user can be realized.

In the present embodiment, the positive output terminal 44p is located at the center of a surface S1 on which the first terminal 44 of the first battery 14a is located. Therefore, the entire arrangement of the first terminal 44 has 180-degree rotational symmetry about the positive output terminal 44p. Thus, the first terminal 44 has rotational symmetry as a whole. Therefore, even when the direction of the first battery 14a in the accommodating space 25 of the battery case 13 is changed, the first terminal 44 is connected to the connector 46 of the battery case 13. Thus, the first battery 14a can supply the electric power to the electric motor M. Similarly, in the second battery 14b, the positive output terminal 45p is located at the center of a surface S2 on which the second terminal 45 of the second battery 14b is located. Therefore, the entire arrangement of the second terminal 45 has 180-degree rotational symmetry about the positive output terminal 45p. Thus, the second terminal 45 has rotational symmetry as a whole. Therefore, even when the direction of the second battery 14b in the accommodating space 25 of the battery case 13 is changed, the second terminal 45 is connected to the connector 47 of the battery case 13. Thus, the second battery 14b can supply the electric power to the electric motor M.

Figure 4:
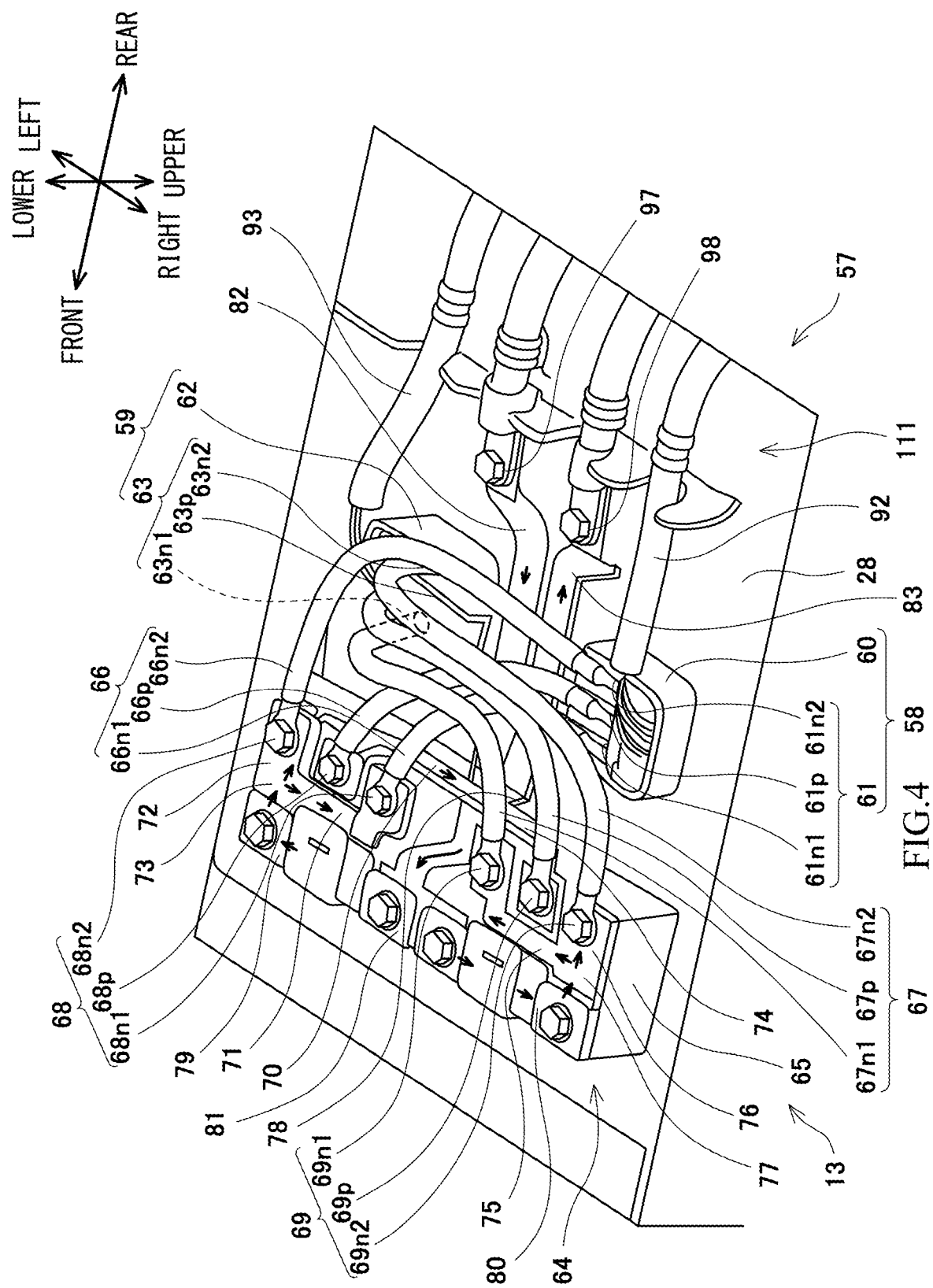
FIG. 4 is a perspective view showing the battery case of the electric vehicle of FIG. 1 when viewed from below in a case where a lid body of the battery case and a cover of a terminal block are detached.

Next, the connection circuit 57 in the adjacent region 33 of the battery case 13 will be described. FIG. 4 is a perspective view showing the connection circuit 57 of the battery case 13 when viewed from below in a case where the lid body 36 of the battery case 13 is detached. In FIG. 4, the lid body 36 is detached from the battery case 13. Moreover, in FIG. 4, a cover 84 of a below-described terminal block 64 is detached.

The connection circuit 57 is located at the inner bottom wall 28 of the battery case 13. Moreover, the inner bottom wall 28 includes the terminal block 64. The terminal block 64 is located in the adjacent region 33 and projects toward the outer bottom wall 48 located at a lower side. The terminal block 64 includes a base 65 and a cover 84 covering the base 65 from below. As described above, in FIG. 4, the cover 84 is detached from the base 65.

An adjacent region connector 58 and an adjacent region connector 59 are located at the inner bottom wall 28 of the battery case 13. The electric power received by the connector 46 and the connector 47 in the accommodating space 25 from the positive output terminals 44p and 45p of the first and second batteries 14a and 14b is supplied through the adjacent region connectors 58 and 59 to the electric power lines of the connection circuit 57 in the adjacent region 33. Moreover, a current having flowed through the electric power lines of the connection circuit 57 in the adjacent region 33 from the electric motor M is supplied through the adjacent region connectors 58 and 59 to the negative output terminals 44n and 45n. The adjacent region connector 58 supplies the electric power from the first battery 14a through the positive output terminal 44p to the electric power lines of the connection circuit 57 and supplies the current from the electric motor M through the negative output terminal 44n to the first battery 14a. The adjacent region connector 59 supplies the electric power from the second battery 14b through the positive output terminal 45p to the electric power lines of the connection circuit 57 and supplies the current from the electric motor M through the negative output terminal 45n to the second battery 14b.

The connectors 31 are located in the accommodating space 25 of the battery case 13. To be specific, the connectors 31 are located at an upper side of the inner bottom wall 28. Moreover, the adjacent region connectors 58 and 59 are located in the adjacent region 33. To be specific, the adjacent region connectors 58 and 59 are located at a lower side of the inner bottom wall 28. In the present embodiment, electric power lines 96 extend between the connector 31 and the adjacent region connector 58 and between the connector 31 and the adjacent region connector 59. The inner bottom wall 28 includes the connector attaching holes 28a penetrating the inner bottom wall 28 in the upper-lower direction (see FIG. 2), and the electric power lines 96 are located inside the connector attaching holes 28a. The current flows between the connector 31 and the adjacent region connector 58 and between the connector 31 and the adjacent region connector 59 through the electric power lines 96 located inside the connector attaching holes 28a. In the present embodiment, the connector 46 includes the connectors 46p, 46n1, and 46n2 that are three cylindrical pins, and the connector 47 includes the connectors 47p, 47n1, and 47n2 that are three cylindrical pins. Moreover, in the present embodiment, portions located in the accommodating space 25 of the battery case 13 are the connectors 31. Moreover, a portion including three connection portions 61 and located inside the adjacent region 33 is the adjacent region connector 58, and a portion including three connection portions 63 and located inside the adjacent region 33 is the adjacent region connector 59.

As shown in FIG. 4, the adjacent region connector 58 includes a main body portion 60 and three connection portions 61. The three connection portions 61 include: a connection portion 61p through which the electric power from the positive output terminal 44p of the first battery 14a is supplied to the electric power line; a connection portion 61n1 through which the current from the electric motor M is transmitted to the battery 14a through the negative output terminal 44n when the first battery 14a is located at the normal position; and a connection portion 61n2 through which the current from the electric motor M is transmitted to the battery 14a through the negative output terminal 44n when the first battery 14a is located at the reversed position. Moreover, the adjacent region connector 59 includes a main body portion 62 and three connection portions 63. The three connection portions 63 include: a connection portion 63p through which the electric power from the positive output terminal 45p of the second battery 14b is supplied to the electric power line; a connection portion 63n1 through which the current from the electric motor M is transmitted to the battery 14b through the negative output terminal 45n when the second battery 14b is located at the normal position; and a connection portion 63n2 through which the current from the electric motor M is transmitted to the battery 14b through the negative output terminal 45n when the second battery 14b is located at the reversed position.

Electric power lines 66 extend from the connection portions 61 to the terminal block 64, and electric power lines 67 extend from the connection portions 63 to the terminal block 64. The three electric power lines 66 extend from the connection portions 61 so as to correspond to the first terminal 44 of the first battery 14a. The three electric power lines 66 include: an electric power line 66p through which the electric power from the positive output terminal 44p of the first battery 14a is introduced; an electric power line 66n1 through which the current from the electric motor M is transmitted to the first battery 14a through the negative output terminal 44n when the first battery 14a is located at the normal position; and an electric power line 66n2 through which the current from the electric motor M is transmitted to the first battery 14a through the negative output terminal 44n when the first battery 14a is located at the reversed position. Moreover, the three electric power lines 67 extend from the connection portions 63 so as to correspond the second terminal 45 of the second battery 14b. The three electric power lines 67 include: an electric power line 67p through which the electric power from the positive output terminal 45p of the second battery 14b is introduced; an electric power line 67n1 through which the current from the electric motor M is transmitted to the second battery 14b through the negative output terminal 45n when the second battery 14b is located at the normal position; and an electric power line 67n2 through which the current from the electric motor M is transmitted to the second battery 14b through the negative output terminal 45n when the second battery 14b is located at the reversed position.

The terminal block 64 includes electric power lines through which the electric power supplied from the electric power lines 66 and 67 is introduced to the electric motor M. The terminal block 64 includes three connection portions 68 corresponding to the three electric power lines 66. The three connection portions 68 include: a connection portion 68p through which the electric power from the positive output terminal 44p of the first battery 14a is received by the terminal block 64; a connection portion 68n1 through which the current from the electric motor M is transmitted to the first battery 14a through the negative output terminal 44n when the first battery 14a is located at the normal position; and a connection portion 68n2 through which the current from the electric motor M is transmitted to the first battery 14a through the negative output terminal 44n when the first battery 14a is located at the reversed position. Moreover, the terminal block 64 includes three connection portions 69 corresponding to the three electric power lines 67. The three connection portions 69 include: a connection portion 69p through which the electric power from the positive output terminal 45p of the second battery 14b is received by the terminal block 64; a connection portion 69n1 through which the current from the electric motor M is transmitted to the second battery 14b through the negative output terminal 45n when the second battery 14b is located at the normal position; and a connection portion 69n2 through which the current from the electric motor M is transmitted to the second battery 14b through the negative output terminal 45n when the second battery 14b is located at the reversed position.

The terminal block 64 includes electric power lines 70, 71, 72, 74, 75, 76, 79, 80, 82, and 83 through which the electric power transferred through the connection portions 68 and 69 flows. The electric power received by the connection portion 68p among the connection portions 68 flows through the electric power line 70 which extends from the connection portion 68p toward the inner bottom wall 28 and is bent thereat toward the middle in the width direction. The electric power received by the connection portion 69p among the connection portions 69 flows through the electric power line 74 which extends from the connection portion 69p toward the inner bottom wall 28 and is bent thereat toward the middle in the width direction.

The electric power line 70 extending from the connection portion 68p is an electric power line (first positive electric power line) through which the electric power from the positive output terminal 44p of the first battery 14a is introduced, and the electric power line 74 extending from the connection portion 69p is an electric power line (second positive electric power line) through which the electric power from the positive output terminal 45p of the second battery 14b is introduced. Therefore, these electric power lines 70 and 74 are connected to each other, and the electric power is supplied to the electric motor M. In the present embodiment, the electric power lines 70 and 74 are connected to each other at a connection portion 78.

Then, the current is introduced to the electric motor M through the electric power line 82 extending rearward. In the present embodiment, the electric power line 82 projects from a rear portion 33a of the adjacent region 33 to a rear side of the adjacent region 33.

On the other hand, an electric power line through which the current that returns to the negative output terminal 44n of the battery 14a from the electric motor M flows extends into the adjacent region 33 through the rear portion 33a of the adjacent region 33. The electric power line 82 having entered the adjacent region 33 branches into the electric power lines 79 and 80 at a connection portion 81. To be specific, the electric power lines 79 and 80 are connected to each other at the connection portion 81. In the present embodiment, the electric power line 79 (first negative electric power line) through which the electric power flowing toward the negative output terminal 44n of the first battery 14a is introduced and the electric power line 80 (second negative electric power line) through which the electric power flowing toward the negative output terminal 45n of the second battery 14b is introduced extend outward in the width direction from the connection portion 81 located at the middle in the width direction.

The electric power line 79 is bent at a width direction outer end portion on the terminal block 64 such that the current flows rearward in the front-rear direction. When the electric power line 79 reaches a connection portion 73, the electric power line 79 branches thereat. In the present embodiment, at the connection portion 73, the electric power line 79 branches into the electric power line 71 extending inward in the width direction and the electric power line 72 extending rearward in the front-rear direction. The electric power line 71 extends toward the connection portion 68$n$1. The electric power line 72 extends toward the connection portion 68$n$2. Since the electric power lines 71 and 72 are electric power lines extending toward the negative output terminal 44$n$ of the first battery 14$a$, the electric power lines 71 and 72 are connected to each other. When the first battery 14$a$ is at the normal position, the electric power line 72 is used such that the electric power is supplied to the negative output terminal 44$n$ of the first battery 14$a$ located at the normal position. When the first battery 14$a$ is at the reversed position, the electric power line 71 is used such that the electric power is supplied to the negative output terminal 44$n$ of the first battery 14$a$ located at the reversed position. In the present embodiment, the electric power lines 71 and 72 are connected to each other at the connection portion 73 on the terminal block 64.

The current flowing toward the connection portion 68$n$1 flows through the electric power line 66$n$1 to the connection portion 61$n$1 and flows to the first battery 14$a$ through the negative output terminal 44$n$ when the first battery 14$a$ is located at the normal position. The current flowing toward the connection portion 68$n$2 flows through the electric power line 66$n$2 to the connection portion 61$n$2 and flows to the first battery 14$a$ through the negative output terminal 44$n$ when the first battery 14$a$ is located at the reversed position.

The electric power line 80 is bent at a width direction outer end portion on the terminal block 64 such that the current flows rearward in the front-rear direction. When the electric power line 80 reaches a connection portion 77, the electric power line 80 branches thereat. In the present embodiment, at the connection portion 77, the electric power line 80 branches into the electric power line 75 extending inward in the width direction and the electric power line 76 extending rearward in the front-rear direction. The electric power line 75 extends toward the connection portion 69$n$1. The electric power line 76 extends toward the connection portion 69$n$2. Since the electric power lines 75 and 76 are electric power lines extending toward the negative output terminal 45$n$ of the second battery 14$b$, the electric power lines 75 and 76 are connected to each other. When the second battery 14$b$ is at the normal position, the electric power line 76 is used such that the electric power is supplied to the negative output terminal 45$n$ of the second battery 14$b$ located at the normal position. When the second battery 14$b$ is at the reversed position, the electric power line 75 is used such that the electric power is supplied to the negative output terminal 45$n$ of the second battery 14$b$ located at the reversed position. In the present embodiment, the electric power lines 75 and 76 are connected to each other at the connection portion 77 on the terminal block 64.

The current flowing toward the connection portion 69$n$1 flows through the electric power line 67$n$1 to the connection portion 63$n$1 and flows to the second battery 14$b$ through the negative output terminal 45$n$ when the second battery 14$b$ is located at the normal position. The current flowing toward the connection portion 69$n$2 flows through the electric power line 67$n$2 to the connection portion 63$n$2 and flows to the second battery 14$b$ through the negative output terminal 45$n$ when the second battery 14$b$ is located at the reversed position.

Figure 5:
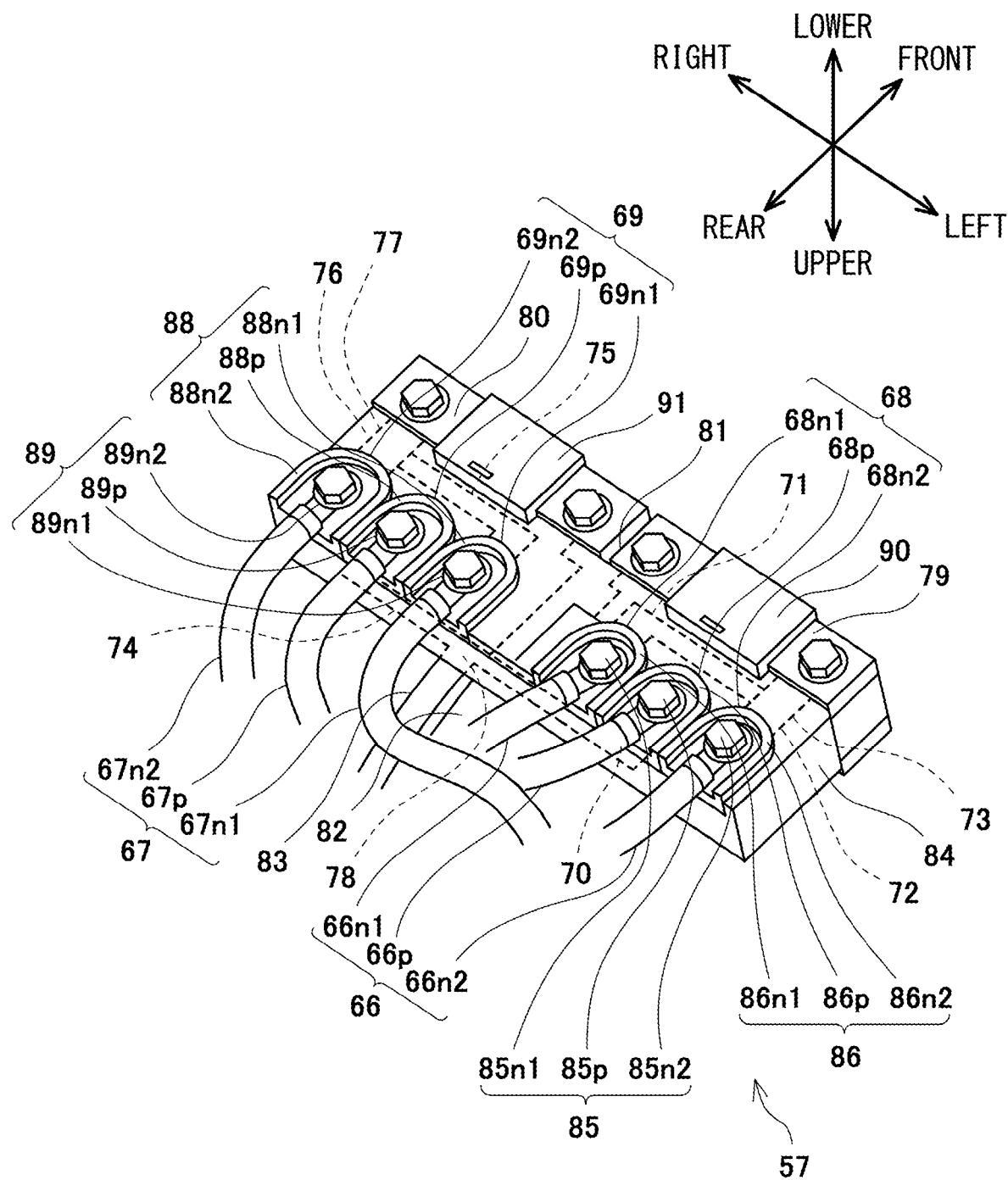
FIG. 5 is a perspective view showing the battery case of the electric vehicle of FIG. 1 when viewed from below in a case where the lid body of the battery case is detached, and the cover of the terminal block is attached.

FIG. 5 is a perspective view showing the connection circuit 57 when viewed from below in a case where the lid body 36 of the battery case 13 is detached, and the cover 84 is attached to the terminal block 64. In the present embodiment, the base 65 is located at the inner bottom wall 28, and the cover 84 is attached to the base 65 so as to cover the base 65.

In the present embodiment, since the cover 84 is attached onto the base 65 of the terminal block 64, walls 86 are located around respective terminals 85 of the electric power lines at the respective connection portions 68. In the present embodiment, the walls 86 correspond to the three connection portions 68 and include: a wall 86$p$ located around the connection portion 68$p$ and surrounding a terminal 85$p$ of the electric power line; a wall 86$n$1 located around the connection portion 68$n$1 and surrounding a terminal 85$n$1 of the electric power line; and a wall 86$n$2 located around the connection portion 68$n$2 and surrounding a terminal 85$n$2 of the electric power line. Moreover, since the cover 84 is attached onto the base 65 of the terminal block 64, walls 88 are located around respective terminals 89 of the electric power lines at the respective connection portions 69. In the present embodiment, the walls 88 correspond to the three connection portions 69 and include: a wall 88$p$ located around the connection portion 69$p$ and surrounding a terminal 89$p$ of the electric power line; a wall 88$n$1 located around the connection portion 69$n$1 and surrounding a terminal 89$n$1 of the electric power line; and a wall 88$n$2 located around the connection portion 69$n$2 and surrounding a terminal 89$n$2 of the electric power line.

The cover 84 is attached to the base 65 of the terminal block 64, and the walls 86 are located around the respective terminals 85 of the electric power lines 66 at the respective connection portions 68. Therefore, at each connection portion 68, the amount of rotation of the electric power line 66 can be restricted by the wall 86. In the present embodiment, each electric power line 66 is connected to the corresponding connection portion 68 so as to be allowed to rotate relative to the corresponding connection portion 68. If the electric power line 66 is freely rotatable relative to the connection portion 68, the electric power line 66 may be disconnected from the connection portion 68 by the repetition of the significant rotation. In the present embodiment, since the cover 84 is attached to the base 65 of the terminal block 64, the amount of rotation of the electric power line 66 can be restricted by the wall 86 at the connection portion 68. Therefore, the electric power line 66 is prevented from being disconnected from the connection portion 68.

Similarly, the cover 84 is attached to the base 65 of the terminal block 64, and the walls 88 are located around the respective terminals 89 of the electric power lines 67 at the respective connection portions 69. Therefore, at each connection portion 69, the amount of rotation of the electric power line 67 can be restricted by the wall 88. In the present embodiment, each electric power line 67 is connected to the corresponding connection portion 69 so as to be allowed to rotate relative to the corresponding connection portion 69. In the present embodiment, since the cover 84 is attached to the base 65 of the terminal block 64, the amount of rotation of the electric power line 67 can be restricted by the wall 88 at the connection portion 69. Therefore, the electric power line 67 is prevented from being disconnected from the connection portion 69.

In the present embodiment, the connection circuit 57 includes fuses 90 and 91 connected to the electric power lines 79 and 80 in the adjacent region 33. In the present embodiment, the fuses 90 and 91 are directly connected to the electric power lines 79 and 80, and the currents flowing through the electric power lines 79 and 80 flow through the fuses 90 and 91. In the present embodiment, at the connection portion 81, the electric power line 82 branches into the electric power lines 79 and 80. The fuse 90 is attached to the electric power line 79, and the fuse 91 is attached to the electric power line 80. Since the fuses 90 and 91 are located at the electric power lines 79 and 80, the electric motor M and the other electrical components can be surely protected by the fuses 90 and 91.

The present embodiment has described a case where the fuses 90 and 91 are used as the electrical components located in the adjacent region 33. However, the above embodiment is not limited to this. Electrical components other than the fuses may be located inside the adjacent region 33. For example, the electrical components, such as a relay and a current sensor, may be located inside the adjacent region 33. In this case, each electrical component may be directly or indirectly connected to the electric power line.

In the present embodiment, the fuses 90 and 91 are located in front of the adjacent region connectors 58 and 59 in the adjacent region 33. To be specific, the fuses 90 and 91 are located in front of the first and second terminals 44 and 45 of the battery 14 and the connectors 46 and 47 of the battery case 13. In the present embodiment, the battery case 13 is inclined relative to the vertical direction such that the opening 21 of the battery case 13 is directed in an upper, rear, and diagonal direction. Therefore, the adjacent region 33 is inclined such that a rear portion thereof extends downward. Since the fuses 90 and 91 are located at a front position with the adjacent region 33 inclined as above, the fuses 90 and 91 are located at an upper position. Therefore, for example, when a maintenance operator performs maintenance of the electric vehicle 1, the operator does not have to get under a lower position. Thus, the electric vehicle 1 that is easy to work for the operator can be realized. Therefore, the ease of maintenance of the fuses 90 and 91 can be improved. For example, when replacing the fuses 90 and 91, the fuses 90 and 91 can be easily replaced with the battery case 13 mounted on the electric vehicle 1.

Moreover, in the present embodiment, the terminal block 64 is in the adjacent region 33 so as to be located in front of a connection position where the connectors 31 are connected to the first terminal 44 and the second terminal 45. Moreover, the battery case 13 is inclined downward as it extends rearward. Therefore, the terminal block 64 is located at an upper position in the adjacent region 33. Thus, even when water enters the adjacent region 33, the terminal block 64 is prevented from being immersed in the water. Moreover, the fuses 90 and 91 are also located at the terminal block 64, and therefore, even when water enters the adjacent region 33, the fuses 90 and 91 are prevented from being immersed in the water.

Moreover, in the present embodiment, the terminal block 64 is included, and the electric power lines including the connection portions 78 and 81 are located on an upper surface of the terminal block 64. Therefore, a step is formed by the terminal block 64, and a portion where the connection portions 61 and the connection portions 63 are located and a portion where the electric power lines are located on the terminal block 64 are different in height from each other. Therefore, the electric power lines 66 between the connection portions 61 and the connection portions 68 and the electric power lines 67 between the connection portions 63 and the connection portions 69 can be made different in height from each other, and therefore, can intersect with each other. Thus, the electric power lines 66 and the electric power lines 67 are prevented from interfering with each other.

Moreover, in the present embodiment, the connection portions 68 at the front side in the front-rear direction and the connection portions 61 at the rear side in the front-rear direction are located at positions opposite to each other in the vehicle width direction while sandwiching the electric power lines 66. Therefore, while reducing the distance in the front-rear direction between the connection portions 68 at the front side and the connection portions 61 at the rear side which sandwich the electric power lines 66, the curvature radius of each electric power line 66 can be increased, and therefore, the curve of each electric power line 66 can be made gentle. Similarly, the connection portions 69 at the front side in the front-rear direction and the connection portions 63 at the rear side in the front-rear direction are located at positions opposite to each other in the vehicle width direction while sandwiching the electric power lines 67. Therefore, while reducing the distance in the front-rear direction between the connection portions 69 at the front side and the connection portions 63 at the rear side which sandwich the electric power lines 67, the curvature radius of each electric power line 67 can be increased, and therefore, the curve of each electric power line 67 can be made gentle. Since the curves of the electric power lines 66 and 67 can be made gentle in the adjacent region 33, loads acting on the electric power lines 66 and 67 can be reduced.

Moreover, as shown in FIG. 4, the electric power lines 66 are located at the connection portions 61 in the adjacent region 33 so as to be substantially parallel to the inner bottom wall 28. To be specific, the electric power lines 66 are located in the adjacent region 33 such that an angle between each electric power line 66 and the inner bottom wall 28 is small. On the other hand, the electric power lines 67 are located at the connection portions 63 such that an angle between each electric power line 67 and the inner bottom wall 28 is large. Moreover, in the width direction, a positional relation between the connection portions 61 and the connection portions 68 to which the electric power lines 66 are connected on the terminal block 64 and a positional relation between the connection portions 63 and the connection portions 69 to which the electric power lines 67 are connected on the terminal block 64 are opposite to each other. Therefore, the electric power lines 66 and the electric power lines 67 easily intersect with each other in the adjacent region 33. Since the electric power lines 66 and the electric power lines 67 intersect with each other in the adjacent region 33, the electric power lines 66 and 67 are compactly accommodated in the adjacent region 33. Thus, the volume of the electric power lines 66 and 67 in the adjacent region 33 can be reduced, and therefore, the adjacent region 33 can be reduced in size. Therefore, the battery case 13 can be reduced in size and weight.

Moreover, an electric power line 92 through which an electric signal is transferred to control the supply of the electric power of the first battery 14a is connected to the adjacent region connector 58. In the present embodiment, the electric power line 92 extends rearward from the adjacent region connector 58. Moreover, an electric power line 93 through which an electric signal is transferred to control the supply of the electric power of the second battery 14b is connected to the adjacent region connector 59. In the present embodiment, the electric power line 93 extends rearward from the adjacent region connector 59.

Figure 6:
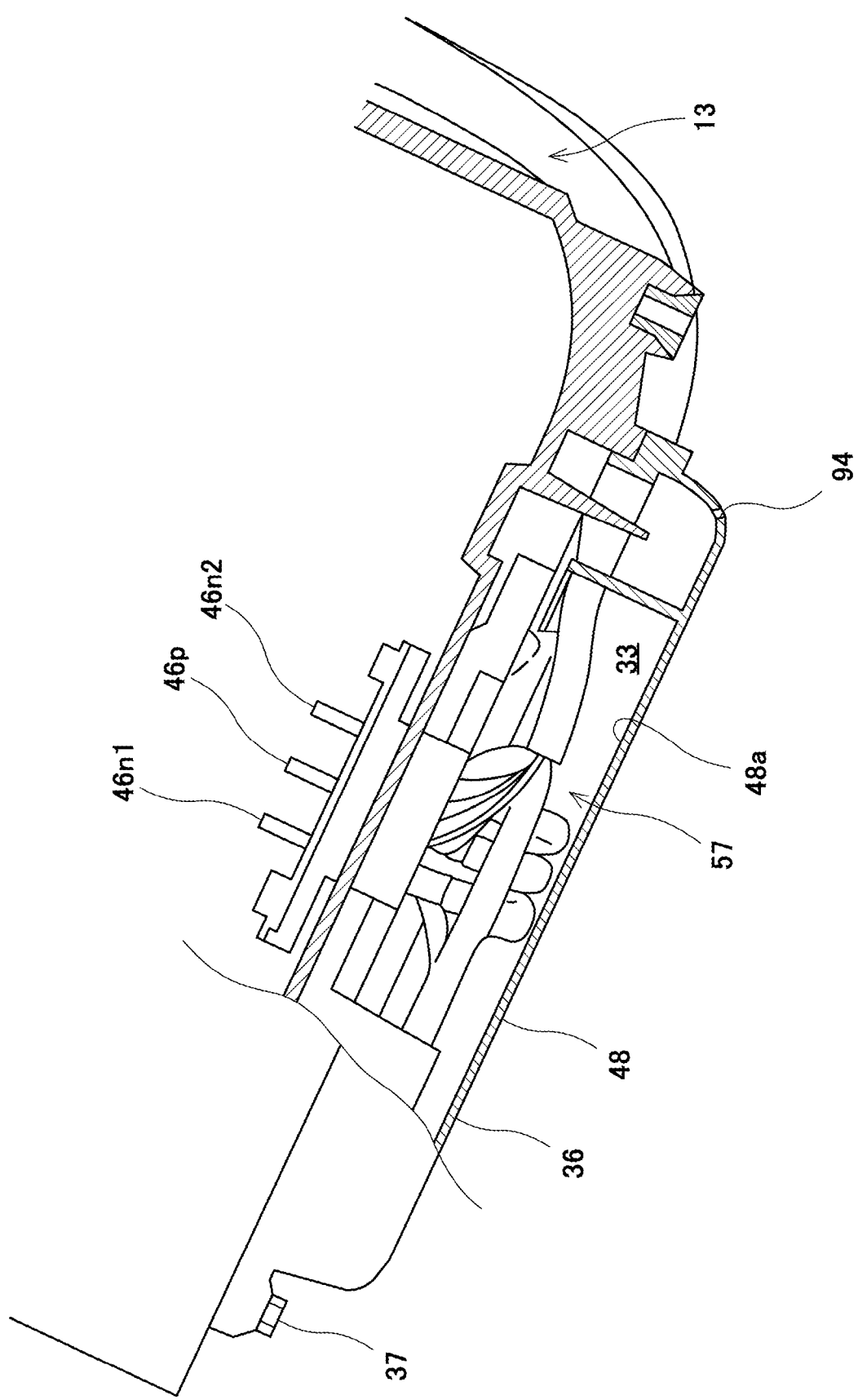
FIG. 6 is a partial sectional view showing an adjacent region of the battery case and its vicinity in the electric vehicle of FIG. 1.

FIG. 6 is a partial sectional view showing the connection circuit 57 and its vicinity with the lid body 36 attached to the battery case 13. As shown in FIG. 6, the lid body 36 is fastened to the battery case 13 with bolts 37. Therefore, the lid body 36 can be detached from the battery case 13 by removing the bolts 37, i.e., the lid body 36 is detachable from the battery case 13. In the present embodiment, since the lid body 36 is attached to the battery case 13 so as to cover the connection circuit 57 from below, an inner surface of the lid body 36 serves as a bottom surface of the adjacent region 33. Moreover, in the present embodiment, as described above, the lid body 36 is inclined relative to a horizontal plane, i.e., the lid body 36 is inclined such that a rear portion of the lid body 36 extends downward. Moreover, a drain hole 94 is located at a rearmost position of the lid body 36. Therefore, the drain hole 94 is located at a lowest position of the lid body 36.

In the present embodiment, the connection portions 78 and 81 at each of which the electric power lines are connected to each other are located in the connection circuit 57. Therefore, the volume of the electric power lines can be made smaller than when the electric power is introduced to the electric motor without connecting the electric power lines to each other. Moreover, the connection portions 78 and 81 are located in the adjacent region 33 located adjacent to the accommodating space 25 of the battery case 13. Therefore, the connection portions 78 and 81 are located close to the connectors 46 and 47 of the accommodating space 25, and therefore, the lengths of the electric power lines can be reduced. Thus, the volume of the electric power lines can be made smaller than when the connection portions are located far from the battery case 13.

In the present embodiment, two batteries that are the first battery 14a and the second battery 14b are mounted on the battery case 13, and the electric power line through which the electric power from the positive output terminal 44p of the first battery 14a is introduced and the electric power line through which the electric power from the positive output terminal 45p of the second battery 14b is introduced are connected to each other. Moreover, the electric power line extending to the negative output terminal 44n of the first battery 14a and the electric power line extending to the negative output terminal 45n of the second battery 14b are connected to each other. In this case, the connection portion 78 is formed for the positive electric power lines, and the connection portion 81 is formed for the negative electric power lines. In the present embodiment, the connection portions 78 and 81 of the electric power lines are located in the adjacent region 33 located adjacent to the accommodating space 25 of the battery case 13. Therefore, the lengths of the electric power lines between the connection portions 78 and 81 and the position where the first terminal 44 of the first battery 14a and the connector 31 are connected to each other and the lengths of the electric power lines between the connection portions 78 and 81 and the position where the second terminal 45 of the second battery 14b and the connector 31 are connected to each other can be reduced. Thus, the volume of the electric power lines can be made smaller than when the connection portions of the electric power lines are located far from the accommodating space 25.

In the present embodiment, the electric power lines 70, 71, 72, 74, 75, 76, 79, 80, 82, and 83 attached to the terminal block 64 are bus bars. Therefore, the electric power lines are bus bars in a portion inside the adjacent region 33 which is located closer to the electric motor M than the connection portions 78 and 81.

Moreover, in the present embodiment, the connection circuit 57 is configured such that: the angle between each electric power line 66 and the inner bottom wall 28 at the connection portion 61 and the angle between each electric power line 67 and the inner bottom wall 28 at the connection portion 63 are made different from each other; and in the width direction, the positional relation between the connection portions 61 and the connection portions 68 and the positional relation between the connection portions 63 and the connection portions 69 are opposite to each other. Therefore, the electric power lines 66 the electric power lines 67 easily intersect with each other in the adjacent region 33. Since the electric power lines 66 and the electric power lines 67 intersect with each other in the adjacent region 33, the distance between the connection portions 78 and 81 of the electric power lines and the adjacent region connectors 58 and 59 can be reduced. Therefore, since the volume of the electric power lines is reduced, the volume of the adjacent region 33 can be reduced, and the electric power lines can be shortened. Since the electric power lines are shortened, the resistance of the electric power lines can be reduced, and the power consumption can be reduced. Moreover, the amount of heat generated by the electric power lines can be reduced.

Moreover, in the present embodiment, the lid body 36 covers the adjacent region 33. This can improve the effect of protecting the connection portions 78 and 81 of the electric power lines which are located at the adjacent region 33. Thus, the electrical components, such as the connection portions 78 and 81 of the electric power lines, located at the adjacent region 33 can be protected from scattering objects that scatter during traveling, colliding objects that collide at the time of falling-down, and the like. Furthermore, the lid body 36 is detachable from the battery case 13. This can improve the ease of work when replacing the components inside the adjacent region 33. For example, the ease of work when replacing the fuses 90 and 91 located inside the adjacent region 33 can be improved.

Moreover, in the present embodiment, the electrical components are accommodated in the adjacent region 33. Examples of the electrical components include a relay and a current sensor. These electrical components are located away from the outer bottom wall 48 that is a lower wall among the walls constituting the lid body 36 and the inner bottom wall 28 which define the adjacent region 33. Specifically, the electrical components are located on walls other than the outer bottom wall 48 among the walls defining the adjacent region 33. In the present embodiment, the electrical components are located on a lower surface of the inner bottom wall 28 that is an upper wall of the adjacent region 33. Therefore, even when water enters the adjacent region 33, the electrical components can be prevented from being immersed in the water staying on the bottom surface of the adjacent region 33.

Moreover, in the present embodiment, a bottom surface 48a of the outer bottom wall 48 among the walls defining the adjacent region 33 is inclined relative to the horizontal plane. Therefore, the water having entered the adjacent region 33 flows downward along the bottom surface of the adjacent region 33. Moreover, in the present embodiment, the drain hole 94 is located at a lower portion of the outer bottom wall 48. Therefore, the water having entered the adjacent region 33 flows downward along the bottom surface 48a of the outer bottom wall 48, and discharging the water to the outside of the adjacent region 33 is promoted. Thus, the electrical components located in the adjacent region 33 can be prevented from being immersed in the water.

Moreover, in the present embodiment, the connection portions 78 and 81 of the electric power lines are located above the other components located in the adjacent region 33. Examples of the other components include: a connection position 97 where a portion of the electric power line 82 which is a bus bar and a portion of the electric power line 82 which is a harnesses including a copper wire covered with resin are connected to each other in the adjacent region 33; and a connection position 98 where a portion of the electric power line 83 which is a bus bar and a portion of the electric power line 83 which is a harnesses including a copper wire covered with resin are connected to each other in the adjacent region 33. In the present embodiment, the connection portions 78 and 81 of the electric power lines are located in front of the connection positions 97 and 98. Therefore, the connection portions 78 and 81 are located above the connection positions 97 and 98 in the upper-lower direction. Moreover, another example of the other components is a lower end portion located at a lower end in the upper-lower direction among accommodated objects accommodated inside the adjacent region 33. In the present embodiment, the rear portion 33a of the adjacent region 33 is located at a rearmost position. Therefore, in the present embodiment, the rear portion 33a of the adjacent region 33 is located at a lower end of the adjacent region 33 in the upper-lower direction. In the present embodiment, the connection portions 78 and 81 of the electric power lines are located in front of the rear portion 33a of the adjacent region 33. Therefore, the connection portions 78 and 81 of the electric power lines are located above the lower end portion located at the lower end in the upper-lower direction among the accommodated objects accommodated in the adjacent region 33. Moreover, yet another example of the other components is a middle portion located at a middle position of the adjacent region 33 in the upper-lower direction among the accommodated objects accommodated in the adjacent region 33. In the present embodiment, among the accommodated objects accommodated in the adjacent region 33, a middle portion in the upper-lower direction between the rear portion 33a of the adjacent region 33 as the lower end of the adjacent region 33 in the upper-lower direction and a portion 100 located at a front side of the terminal block 64 as an upper end of the adjacent region 33 in the upper-lower direction is referred to as a middle portion 101 (see FIG. 2). In the present embodiment, the connection portions 78 and 81 of the electric power lines are located above the middle portion 101. Moreover, examples of the other components include lower end positions 99 that are portions at lowermost ends of the electric power lines 66 and 67 extending from the adjacent region connectors 58 and 59. In the present embodiment, as shown in FIG. 2, the electric power lines 66 and 67 project downward from the adjacent region connectors 58 and 59 and then extend. Portions, located at lowermost ends, of the electric power lines 66 and 67 extending from the adjacent region connectors 58 and 59 are the lower end positions 99. The connection portions 78 and 81 of the electric power lines are located above the lower end positions 99 in the upper-lower direction. As described above, the connection portions 78 and 81 of the electric power lines are located in a region of the adjacent region 33 which is located above a region where the other components are located. Thus, water can be prevented from being splashed onto the connection portions of the electric power lines.

Moreover, in the present embodiment, the connection circuit 57 is accommodated in the adjacent region 33, and the electric power lines are located above and away from the lid body 36. As above, the electric power lines are located above and away from a bottom portion of the adjacent region 33. Therefore, water can be prevented from being splashed onto the electric power lines.

Moreover, in the present embodiment, the electric power lines 82 and 83 pass through a rear portion of the adjacent region 33 to a rear side of the adjacent region 33. Therefore, as compared to when the electric power lines pass through a front side of the adjacent region 33, rain water moving from a front side to a rear side during traveling can be prevented from entering the adjacent region 33 through insertion holes through which the electric power lines passes.

Moreover, in the present embodiment, each of the connection portions 78 and 81 of the electric power lines is a portion where the positive electric power lines corresponding to the batteries are connected to each other or a portion where the negative electric power lines corresponding to the batteries are connected to each other. Therefore, the connection portion where the positive electric power lines are connected to each other and the connection portion where the negative electric power lines are connected to each other can be located close to the connectors 46 and 47. Thus, the battery case 13 can be reduced in size.

Moreover, in the present embodiment, since the electrical components, such as a fuse, a relay, and a current sensor, are located in the adjacent region 33, the electrical components can be located close to the connection portions, and wiring work can be made easier than when the electrical components are located far from the battery case 13.

The above embodiment has described a case where the connection portions of the electric power lines are the connection portions 78 and 81 formed since the batteries are mounted on the battery case 13. However, the above embodiment is not limited to this. For example, even when one battery is mounted, the connection portion may be a connection portion where electric power lines extending from output terminals of the same polarity are connected to each other such that even when the direction of the battery 14 in the battery case 13 is changed, power supply to the electric motor M can be secured.

In the present embodiment, even when the first battery 14a is at any of the normal position and the reversed position, the negative output terminal 44n of the first battery 14a is connected to the connector 46 and realize electric power supply from the first battery 14a, and the dummy terminal 44d of the first battery 14a is not connected to the connector 46 and does not realize electric power supply from the first battery 14a. The electric power lines 71 and 72 are connected to each other at the connection portion 73 such that the connection circuit 57 is configured as above. Moreover, the electric power lines 75 and 76 are connected to each other at the connection portion 77.

In the connection circuit 57, the electric power line 71 through which the electric power is introduced to the negative output terminal 44n when the first battery 14a is at the normal position and the electric power line 72 through which the electric power is introduced to the negative output terminal 44n when the first battery 14a is at the reversed position are connected to each other at the connection portion 73. Moreover, the electric power line 75 through which the electric power is introduced to the negative output terminal 45n when the second battery 14b is at the normal position and the electric power line 76 through which the electric power is introduced to the negative output terminal 45n when the second battery 14b is at the reversed position are connected to each other at the connection portion 77. To be specific, the electric power line connected to the negative output terminal 44*n* and the electric power line connected to the dummy terminal 44*d* are connected to each other at the connection portion 73 of the connection circuit 57. Moreover, the electric power line connected to the negative output terminal 45*n* and the electric power line connected to the dummy terminal 45*d* are connected to each other at the connection portion 77 of the connection circuit 57. The connection portions 73 and 77 of the electric power lines are located in the adjacent region 33 located adjacent to the accommodating space 25 of the battery case 13. Therefore, the volume of the electric power lines can be made smaller than when the connection portions of the electric power lines are located far from the accommodating space 25. In this case, the connection portions of the electric power lines are the connection portions 73 and 77.

Moreover, the connection portion may be a connection portion where electric power lines are connected to each other due to the other reason. To be specific, the connection portion may be a connection portion where electric power lines are connected to each other due to a reason other than the reason that there are the batteries and the reason that electric power supply is realized even when the direction of the battery is changed. As long as the connection portion where the electric power lines are connected to each other is located in the adjacent region, the connection portion may be any connection portion.

The above embodiment has describe a case where the adjacent region 33 is located under the accommodating space 25. However, the above embodiment is not limited to this. The adjacent region does not have to be located under the accommodating space. For example, the adjacent region may be located behind the accommodating space, at a lateral side of the accommodating space in the vehicle width direction, or above the accommodating space. As above, the adjacent region may be located adjacent to the accommodating space.

The above embodiment has described a case where the electric vehicle 1 is an electric vehicle driven only by the electric motor M. However, the above embodiment is not limited to this. A vehicle to which the present disclosure is applied may be a hybrid vehicle including a driving wheel driven by an engine and a motor. Moreover, the present disclosure is also applicable to an electric bicycle and an electric power assist bicycle.

Moreover, the above embodiment has described a case where the accommodating space 25 for the battery 14 is located between the front wheel 2 and the electric motor M in the front-rear direction of the electric vehicle 1. However, the above embodiment is not limited to this. For example, the accommodating space may be located above the motor. Furthermore, the accommodating space may be located under or behind the seat on which the rider is seated.

Moreover, the above embodiment has described a case where the battery case 13 is attached to the electric vehicle 1 so as to be inclined downward as it extends rearward. However, the above embodiment is not limited to this. The battery case may be attached to the electric vehicle so as to be inclined upward as it extends rearward. Furthermore, the battery case may be attached to the electric vehicle without being inclined. The battery case may be attached to the electric vehicle such that the bottom surface of the adjacent region extends horizontally without being inclined.

Moreover, the above embodiment has described a case where the lid body 36 and the battery case 13 are attached to the electric vehicle 1 so as to be inclined such that the bottom surface of the adjacent region 33 is inclined downward as it extends rearward. However, the above embodiment is not limited to this. For example, the bottom surface of the adjacent region may be inclined downward as it extends toward one side in the vehicle width direction. Furthermore, the bottom surface of the adjacent region may be inclined downward as it extends toward one side in the front-rear direction and one side in the vehicle width direction. Moreover, for example, when the electric vehicle 1 includes a side stand, the adjacent region 33 may be inclined downward as it extends toward a side where the side stand exists in the vehicle width direction, in a case where the electric vehicle 1 stands by itself by the side stand. Moreover, in this case, the drain hole may be eccentrically located at the side where the side stand exists in the vehicle width direction. Moreover, the above embodiment has described a case where as the battery case 13 and the lid body 36 extend rearward, they are inclined downward to the same degree. However, the above embodiment is not limited to this. The battery case 13 and the lid body 36 may be configured such that the inclination of the battery case 13 and the inclination of the lid body 36 are different from each other. To be specific, the battery case 13 and the lid body 36 may be configured such that the inclination of the bottom surface of the accommodating space 25 and the inclination of the bottom surface of the adjacent region 33 are different from each other. For example, the battery case 13 and the lid body 36 may be configured such that the bottom surface of the accommodating space 25 is horizontal, and only the bottom surface of the adjacent region 33 is inclined.

Moreover, the above embodiment has described a case where the terminals of the battery 14 are the outlets as recesses, and the connectors 31 of the battery case 13 are the pins as projections. However, the above embodiment is not limited to this. The recesses and the projections may be reversed. To be specific, the terminals of the battery 14 may be the projections, and the connectors 31 of the battery case 13 may be the recesses.

Moreover, the above embodiment has described a case where the electric power lines are used to supply the electric power from the battery 14 to the electrical components, such as the electric motor M. However, the above embodiment is not limited to this. In addition to the supply of the electric power from the battery to the electrical components, such as the motor, the electric power lines may also be used to supply the electric power from a charger to the battery.

Moreover, the above embodiment has described a case where the negative output terminal and the dummy terminal are symmetrical about the positive output terminal, and the terminals have rotational symmetry as a whole. However, the above embodiment is not limited to this. The negative output terminal may be located at the center. In this case, the positive output terminal and the dummy terminal may be symmetrical about the negative output terminal, and the terminals may have rotational symmetry as a whole.

The above embodiment has described a case where the adjacent region located adjacent to the accommodating space is located under the battery case. However, the above embodiment is not limited to this. For example, the adjacent region may be located in front of, behind, or at a lateral side of the battery case.

Moreover, the above embodiment has described a case where two batteries are mounted on the battery case. However, the above embodiment is not limited to this. The number of batteries mounted on the battery case may be a number other than two. The number of batteries mounted on the battery case may be three or more. In this case, the number of connection portions in the connection circuit may be equal to the number of batteries. Moreover, the number of batteries and the number of connection portions do not have to be equal to each other. Only the electric power lines extending from some of the batteries may be connected to each other. Moreover, the number of batteries may be one as long as the circuit includes the connection portion since a plurality of positive output terminals or a plurality of negative output terminals exist, and a plurality of electric power lines extending from the positive output terminals or the negative output terminals exist such that the direction of the battery to be mounted can be changed.

Moreover, the above embodiment has described a case where the battery includes one positive output terminal and two negative output terminals such that the direction of the battery in the battery case can be changed. However, the above embodiment is not limited to this. The battery may include one negative output terminal and two positive output terminal. Moreover, as long as the positional relation between the positive output terminal and the negative output terminal is symmetrical in the battery, the positive output terminal and the negative output terminal may have another configuration. For example, two negative output terminals may be located at each of both sides of two positive output terminals.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The following aspects disclose preferred embodiments.

First Aspect

An electric vehicle including:
an electric motor that generates rotational power by which a driving wheel is driven;
a battery case defining a battery accommodating space accommodating at least one battery;
connectors that are located in the battery case, accommodated in the battery accommodating space, and electrically connected to respective terminals of the battery; and
electric power lines through which electric power of the battery is supplied to the electric motor, wherein
the electric power lines include a connection circuit that includes a connection portion where the electric power lines extending from the connectors are connected to each other, the connection portion being located in an adjacent region located adjacent to the connectors.

Second Aspect

The electric vehicle according to the first aspect, wherein the battery case includes a lid body covering the adjacent region.

Third Aspect

The electric vehicle according to the first or second aspect, wherein an electrical component accommodated in the adjacent region is located away from a lower wall among walls defining the adjacent region.

Fourth Aspect

The electric vehicle according to the second aspects, wherein:
a bottom surface of a lower wall defining the adjacent region is inclined downward as it extends rearward;
the battery case includes a lid body covering the adjacent region; and
a lower portion of the lid body includes a drain hole.

Fifth Aspect

The electric vehicle according to any one of the first to fourth aspects, wherein the connection portion is located above another component accommodated in the adjacent region.

Sixth Aspect

The electric vehicle according to any one of the first to fifth aspects, wherein:
the electric power lines include projecting portions that project from the adjacent region and extend toward the electric motor; and
the projecting portions project from a rear portion of the adjacent region to a rear side of the adjacent region.

Seventh Aspect

The electric vehicle according to any one of the first to sixth aspects, wherein:
the at least one battery includes a first battery and a second battery;
the connectors include a positive connector and negative connector connected to terminals of the first battery and a positive connector and negative connector connected to terminals of the second battery;
the electric power lines include a first positive electric power line electrically connected to a positive output terminal of the first battery, a first negative electric power line electrically connected to a negative output terminal of the first battery, a second positive electric power line electrically connected to a positive output terminal of the second battery, and a second negative electric power line electrically connected to a negative output terminal of the second battery; and
at the connection portion, the first positive electric power line and the second positive electric power line are connected to each other, or the first negative electric power line and the second negative electric power line are connected to each other.

Eighth Aspect

The electric vehicle according to any one of the first to seventh aspects, wherein:
the terminals of the at least one battery include at least one positive output terminal, at least one negative output terminal, and at least one dummy terminal that does not contribute to electric power supply;
the at least one battery and the battery case are configured such that
the at least one dummy terminal and one of the at least one positive output terminal and the at least one negative output terminal sandwich the other of the at least one positive output terminal and the at least one negative output terminal, the terminals are located symmetrically as a whole, and even when a direction of the at least one battery in the battery case is changed, electric power from the at least one battery is supplied to the electric motor through the at least one positive output terminal and the at least one negative output terminal; and the electric power line connected to the one of the at least one positive output terminal and the at least one negative output terminal and the electric power line connected to the at least one dummy terminal are connected to each other at the connection portion of the connection circuit.

Ninth Aspect

The electric vehicle according to any one of the first to eighth aspects, wherein the connection circuit includes an electrical component that is located in the adjacent region and directly or indirectly connected to the electric power line.

What is claimed is:

1. An electric vehicle comprising:
an electric motor that generates rotational power by which a driving wheel is driven;
a battery case defining a battery accommodating space accommodating at least one battery;
connectors that are located in the battery case, accommodated in the battery accommodating space, and electrically connected to respective terminals of the battery; and
electric power lines through which electric power of the battery is supplied to the electric motor, wherein
the terminals of the at least one battery comprise at least one positive output terminal, at least one negative output terminal, and at least one dummy terminal that does not contribute to electric power supply,
the electric power lines include a connection circuit that includes a connection portion where the electric power lines extending from the connectors are connected to each other, the connection portion being located in an adjacent region located adjacent to the connectors,
the at least one battery and the battery case are configured such that:
the at least one dummy terminal and one of the at least one positive output terminal and the at least one negative output terminal sandwich the other of the at least one positive output terminal and the at least one negative output terminal;
the terminals are located symmetrically as a whole; and
even when a direction of the at least one battery in the battery case is changed, electric power from the at least one battery is supplied to the electric motor through the at least one positive output terminal and the at least one negative output terminal, and
the electric power line connected to the one of the at least one positive output terminal and the at least one negative output terminal and the electric power line connected to the at least one dummy terminal are connected to each other at the connection portion of the connection circuit.

2. The electric vehicle according to claim 1, wherein the battery case includes a lid body covering the adjacent region.

3. The electric vehicle according to claim 1, wherein an electrical component accommodated in the adjacent region is located away from a lower wall among walls defining the adjacent region.

4. The electric vehicle according to claim 2, wherein:
a bottom surface of a lower wall defining the adjacent region is inclined downward as it extends rearward;
the battery case includes a lid body covering the adjacent region; and
a lower portion of the lid body includes a drain hole.

5. The electric vehicle according to claim 1, wherein the connection portion is located above another component accommodated in the adjacent region.

6. The electric vehicle according to claim 1, wherein:
the electric power lines include projecting portions that project from the adjacent region and extend toward the electric motor; and
the projecting portions project from a rear portion of the adjacent region to a rear side of the adjacent region.

7. The electric vehicle according to claim 1, wherein:
the at least one battery comprises a first battery and a second battery;
the connectors comprise a positive connector and negative connector connected to terminals of the first battery and a positive connector and negative connector connected to terminals of the second battery;
the electric power lines comprise a first positive electric power line electrically connected to a positive output terminal of the first battery, a first negative electric power line electrically connected to a negative output terminal of the first battery, a second positive electric power line electrically connected to a positive output terminal of the second battery, and a second negative electric power line electrically connected to a negative output terminal of the second battery; and
at the connection portion, the first positive electric power line and the second positive electric power line are connected to each other, or the first negative electric power line and the second negative electric power line are connected to each other.

8. The electric vehicle according to claim 1, wherein the connection circuit includes an electrical component that is located in the adjacent region and directly or indirectly connected to the electric power line.

9. The electric vehicle according to claim 1, wherein the other of the at least one positive output terminal and the at least one negative output terminal is located in a middle between the at least one dummy terminal and the one of the at least one positive output terminal and the at least one negative output terminal.

10. The electric vehicle according to claim 1, wherein the at least one dummy terminal and the one of the at least one positive output terminal and the at least one negative output terminal sandwich the other of the at least one positive output terminal and the at least one negative output terminal and have 180-degree rotational symmetry.

11. The electric vehicle according to claim 1, wherein the adjacent region is located under the battery accommodating space.

12. The electric vehicle according to claim 1, wherein the one of the at least one positive output terminal and the at least one negative output terminal, the other of the at least one positive output terminal and the at least one negative output terminal, and the at least one dummy terminal are located such that:
the at least one dummy terminal and the one of the at least one positive output terminal and the at least one negative output terminal sandwich, and have rotational symmetry about, the other of the at least one positive output terminal and the at least one negative output terminal; and the one of the at least one positive output terminal and the at least one negative output terminal, the other of the at least one positive output terminal and the at least one negative output terminal, and the at least one dummy terminal have rotational symmetry as a whole.

13. An electric vehicle comprising:

an electric motor that generates rotational power by which a driving wheel is driven;

a battery case defining a battery accommodating space accommodating at least one battery;

connectors that are located in the battery case, accommodated in the battery accommodating space, and electrically connected to respective terminals of the battery; and electric power lines through which electric power of the battery is supplied to the electric motor, wherein the electric power lines include a connection circuit that includes a connection portion where the electric power lines extending from the connectors are connected to each other, the connection portion being located in an adjacent region located adjacent to the connectors, the at least one battery includes a first battery and a second battery, the battery accommodating space includes a space corresponding to the first battery and a space corresponding to the second battery, the connectors include:
- a positive connector and a negative connector which are connected to terminals of the first battery; and
- a positive connector and a negative connector which are connected to terminals of the second battery, the electric power lines include:
- a first positive electric power line electrically connected to a positive output terminal of the first battery;
- a first negative electric power line electrically connected to a negative output terminal of the first battery;
- a second positive electric power line electrically connected to a positive output terminal of the second battery; and
- a second negative electric power line electrically connected to a negative output terminal of the second battery, the first battery and the second battery are connected to the electric motor in parallel, in the connection circuit, the electric power line extending from the electric motor branches into the first negative electric power line and the second negative electric power line at the connection portion, the first negative electric power line extending to the negative connector of the first battery and then extending to the negative output terminal of the first battery, the second negative electric power line extending to the negative connector of the second battery and then extending to the negative output terminal of the second battery, and in the connection circuit, the first positive electric power line through which the electric power is supplied from the positive output terminal of the first battery through the positive connector of the first battery to the electric motor and the second positive electric power line through which the electric power is supplied from the positive output terminal of the second battery through the positive connector of the second battery to the electric motor are connected to each other at the connection portion.

14. The electric vehicle according to claim 13, wherein the battery case includes a battery wall defining the battery accommodating space, and the connection circuit is adjacent to the connectors across the battery wall.

15. The electric vehicle according to claim 14, wherein the battery wall includes:
- an inner bottom wall supporting the at least one battery from below; and
- a side wall extending upward from the inner bottom wall and surrounding a lateral side of the battery accommodating space, and the connection circuit is adjacent to the connectors across the inner bottom wall.

* * * * *